(12) United States Patent
Zenzen et al.

(10) Patent No.: US 6,510,372 B1
(45) Date of Patent: Jan. 21, 2003

(54) METHOD OF ELECTRONIC BRAKE FORCE DISTRIBUTION WHILE CORNERING

(75) Inventors: Markus Zenzen, Hattersheim (DE); Thomas Pröger, Rödermark (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/194,293

(22) PCT Filed: May 20, 1997

(86) PCT No.: PCT/EP97/02560

§ 371 (c)(1),
(2), (4) Date: Sep. 1, 1999

(87) PCT Pub. No.: WO97/44224

PCT Pub. Date: Nov. 27, 1997

(30) Foreign Application Priority Data

May 22, 1996 (DE) .......................... 196 20 584

(51) Int. Cl.⁷ ............................ G06F 19/00; G06F 7/70; B60T 8/24
(52) U.S. Cl. ............................ 701/70; 701/72; 701/75; 701/79; 701/89; 180/197; 180/242; 303/169; 303/DIG. 67
(58) Field of Search .................. 701/70, 74, 75, 701/76, 79, 89, 72; 180/197, 242; 303/169, DIG. 7

(56) References Cited

U.S. PATENT DOCUMENTS

| | | | |
|---|---|---|---|
| 4,750,125 A | * 6/1988 | Leppek et al. | 701/83 |
| 5,016,179 A | * 5/1991 | Utzt | 701/75 |
| 5,109,694 A | 5/1992 | Yahagi et al. | 73/9 |
| 5,163,742 A | 11/1992 | Topfer et al. | 303/100 |
| 5,185,704 A | 2/1993 | Okubo | 364/426.02 |
| 5,210,692 A | * 5/1993 | Fennel et al. | 701/74 |
| 5,292,184 A | * 3/1994 | Takata | 303/100 |
| 5,303,988 A | * 4/1994 | Okubo | 303/103 |
| 5,329,805 A | 7/1994 | Yahagi et al. | 73/9 |
| 5,415,469 A | 5/1995 | Poggenburg et al. | 303/106 |
| 5,429,428 A | * 7/1995 | Yasuda | 303/103 |
| 5,494,344 A | 2/1996 | Heyn et al. | 303/140 |
| 5,519,615 A | * 5/1996 | Schob et al. | 701/70 |
| 5,597,215 A | * 1/1997 | Fischle et al. | 303/139 |
| 5,669,677 A | * 9/1997 | Fischer | 303/147 |
| 5,749,062 A | * 5/1998 | Yamamoto et al. | 701/72 |
| 5,771,479 A | * 6/1998 | Yamamoto et al. | 701/70 |
| 5,855,419 A | * 1/1999 | Urai et al. | 303/9.69 |
| 6,044,320 A | * 3/2000 | Stuible et al. | 701/72 |
| 6,052,643 A | 4/2000 | Batistic | 701/72 |

FOREIGN PATENT DOCUMENTS

DE 43 14 830 10/1994
DE 4314830 11/1994

* cited by examiner

Primary Examiner—Jacques H. Louis-Jacques
Assistant Examiner—Brian J Broadhead
(74) Attorney, Agent, or Firm—Rader, Fishman & Grauer PLL

(57) ABSTRACT

A method of electronic brake force distribution in a two-axle four-wheel vehicle 1 effects a compensation of the speed differences between left and right vehicle side during cornering. To this end, a compensation speed is calculated for the curve-inward rear wheel 6 and added to the individual wheel speed of the rear wheel 6 to be compared with a vehicle reference speed. The individual wheel reference speed of this wheel, which is this way increased in relation to the individual wheel speed of the curve-inward rear wheel 6, prevents a premature activation of electronic brake force distribution because the produced individual wheel reference speed is closer to the vehicle reference speed than the individual wheel speed. This permits better utilizing brake force during cornering.

8 Claims, 2 Drawing Sheets

METHOD OF ELECTRONIC BRAKE FORCE DISTRIBUTION WHILE CORNERING

METHOD OF ELECTRONIC BRAKE FORCE DISTRIBUTION

The present invention relates to a method of electronic brake force distribution (EBD) on a two-axle, four-wheel vehicle during cornering, wherein a respective individual wheel reference speed derived from at least one wheel sensor signal is compared with a vehicle reference speed to determine the activation of electronic brake force distribution on a rear wheel.

Methods of this type are known in manifold ways and used in first line to prevent the rear wheels from locking prior to the front wheels during braking operations. When needed, a pressure maintenance phase or a pressure reduction phase is initiated in pressure-fluid operated brake systems on the rear-axle brakes, which avoids that the brake slip of the rear-axle brakes continues to increase and prevents locking of the rear wheels. A customary manner of detecting whether there is a need for initiating electronic brake force distribution includes comparing the wheel speeds of the rear wheels (wheel speed always means the wheel circumferential speed) with a vehicle reference speed that is determined from all wheel speeds. When an individual wheel speed of a rear wheel during braking is considerably slower than the vehicle reference speed, a great amount of brake slip is identified, and a pressure maintenance phase is introduced, for example, in a pressure-fluid operated brake system so that the brake pressure on any one or on both of the rear wheels is not further increased.

To determine a vehicle reference speed, it is customary to take into account the individual wheel speed of the slowest wheel during acceleration of the vehicle. During braking or deceleration, the individual wheel speed of the respectively fastest wheel is adopted as vehicle reference speed. Also, there are considerations to take into account the second slowest wheel or the second fastest wheel to determine the vehicle reference speed. However, the principle always resides in that the wheel representative of the vehicle reference speed has the lowest amount of slip, if possible. When cornering, the problem is that of course the outward wheels in a curve have a higher individual wheel speed than the curve-inward wheels. Accordingly, the individual wheel speed of one of the curve-outward wheels is taken as the vehicle reference speed. The brake slip calculated by the electronic controller, which is computed of the difference between the vehicle reference speed and the individual wheel speed of the rear wheels is, thus, faulty due to the influence of geometry during cornering. The effect is that a pressure maintenance phase is introduced too early during electronic brake force distribution and, under certain circumstances, an excessive amount of pressure is discharged during control.

However, if the threshold of entry into a pressure maintenance phase was increased, the curve-outward rear wheel would possibly be overbraked, which might cause loss in cornering forces.

An object of the present invention is to provide a method of the type mentioned hereinabove for electronic brake force distribution which compensates the influence of geometry during cornering.

This object is achieved by assigning an individual wheel reference speed instead of an individual wheel speed to the curve-inward rear wheel when an information about cornering is obtained. The individual wheel reference speed is calculated as a sum of the individual wheel speed and a compensation speed.

DETAILED DESCRIPTION OF A PREFERRED EMBODIMENT

Figure 1:
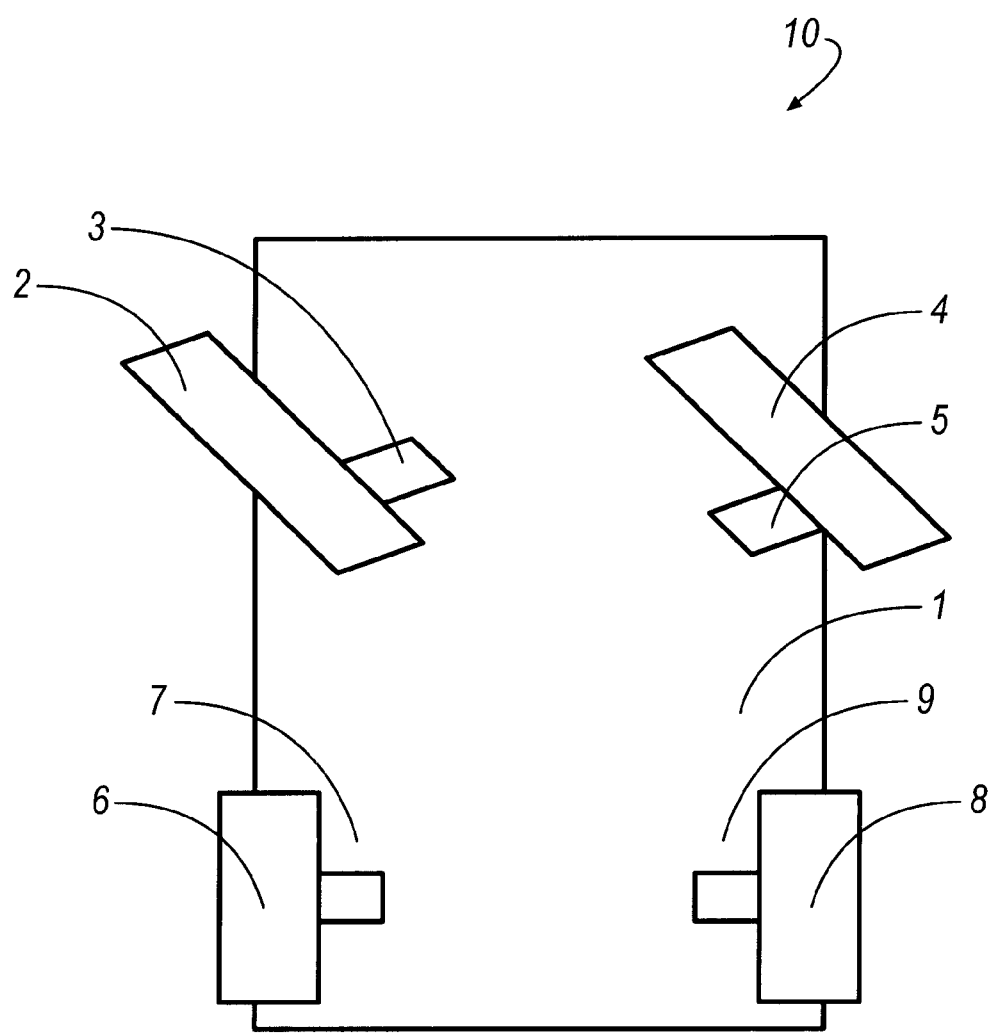
FIG. 1 shows a top view of a two-axle, four-wheel vehicle in a left turn.

The vehicle 1 has a left front wheel 2 with a wheel sensor 3, a right front wheel 4 with a wheel sensor 5, a left rear wheel 6 with a wheel sensor 7, and a rear right wheel 8 with a wheel sensor 9. The arrow 10 describes the direction of travel of the vehicle.

Figure 2:
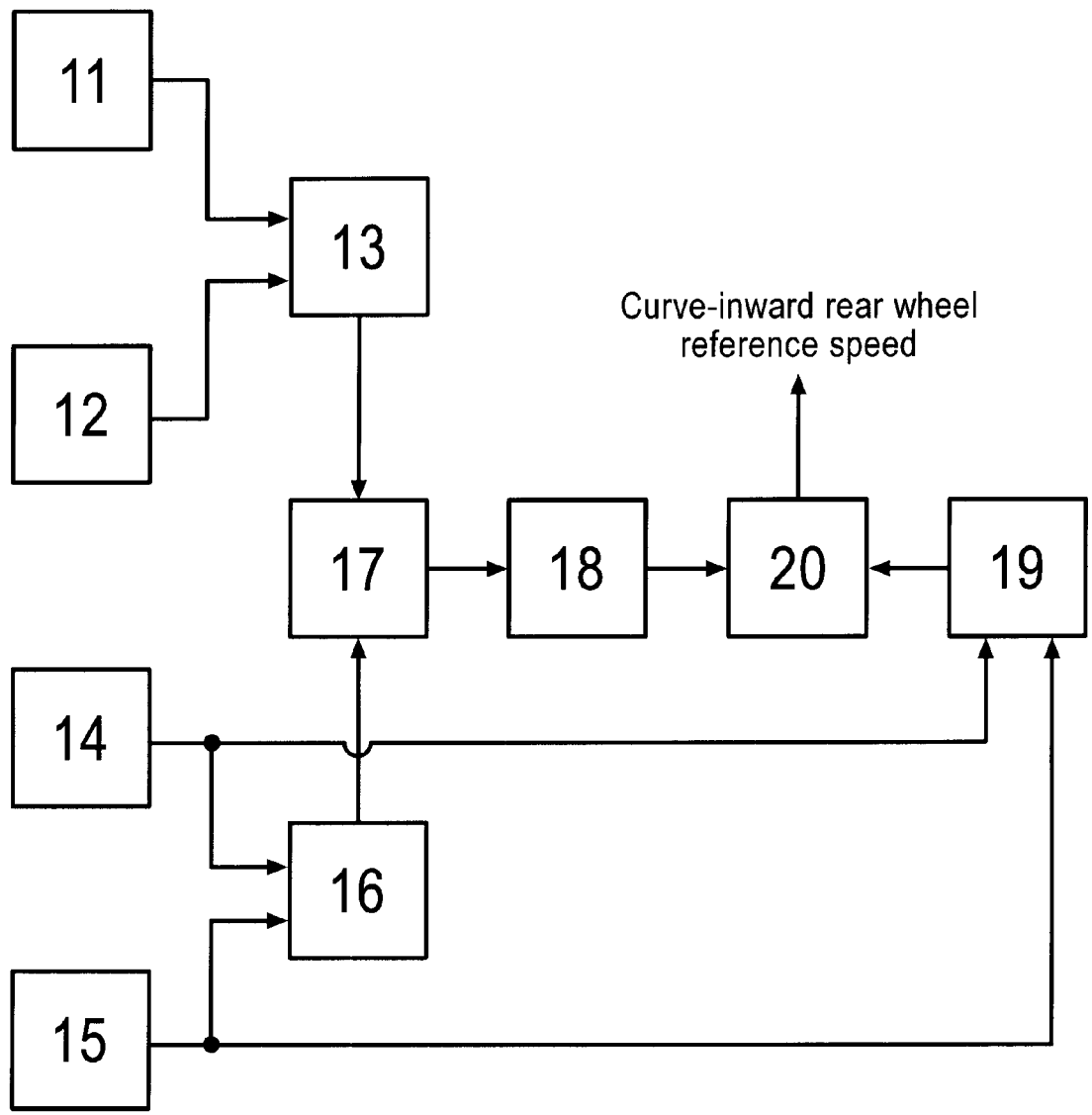
FIG. 2 illustrates steps of the claimed invention.

FIG. 2 illustrates a succession of steps characterizing the present invention. Determining an individual speed of right front wheel 4 by a signal from sensor 5 is represented by square 11. Square 12 represents determining an individual speed of left front wheel 2 by a signal from sensor 3. Similarly, determining individual speeds of right 8 and left 6 rear wheels by signals from respective sensors 9 and 7 is shown by squares 14 and 15. Determining differences between front wheel speeds and between rear wheel speeds is illustrated by squares 13 and 16, respectively. Summing the differences is supposed to occur in square 17, whereas calculating a compensation speed by dividing the resulting sum by factor k, described below in more detail, is attributed to square 18. Square 19 illustrates comparing rear wheel individual speeds to define the lesser one associated with the curve-inward rear wheel. In FIG. 1, it is wheel 6. This lesser speed is added in square 20 to the compensation speed to be set as the individual wheel reference speed of this rear wheel.

The method according to the invention assigns an individual wheel reference speed instead of an individual wheel speed to the curve-inward rear wheel 6 when an information about cornering is obtained. The individual wheel reference speed is calculated as a sum of the individual wheel speed obtained from the wheel sensor 7 and a compensation speed.

The activation threshold of electronic brake force distribution being maintained, the curve-inward rear wheel 6 may then definitely have a considerably lower individual wheel speed than the wheel which produces the vehicle reference speed when the vehicle is cornering. Because the individual wheel reference speed is taken into account for the criterion of activation of electronic brake force distribution, a pressure maintenance phase will not be introduced until the curve-inward rear wheel 6 or the curve-outward rear wheel 8 experience a really great amount of brake slip.

It should still be noted as an explanation that the term "individual wheel speed" relates to the wheel circumferential speed which is determined by way of the wheel sensor 3,5,7,or 9, respectively associated with the wheel 2,4,6, or 8 concerned. The individual wheel reference speed represents the sum of individual wheel speed and compensation speed on the slower rear wheel 6 during cornering. The individual wheel speed and the individual wheel reference speed are coincident on the other wheels 2,4, and 8.

It is possible that a difference between the speeds of the front wheels 2 and 4 occurs alone because one of the front wheels travels through a pot hole, for example, and thereby experiences a great deceleration. To be sure that such a speed difference between the front-wheel speeds is indeed due to cornering, it is advisable to compare the individual wheel speeds of the rear axle wheels 6 and 8 and to compare the differences between the front wheels 2 and 4 and the rear wheels 6 and 8. Only with identical signs of these differences between left and right vehicle side is it possible to assume cornering with certainty.

In a compensation of geometry effects during cornering according to the present invention, it is advisable during braking to adopt as the vehicle reference speed the maximum individual wheel speed because the wheel having the highest speed exhibits the lowest slip during braking and, thus, its circumferential speed most likely corresponds to the actual vehicle speed.

Taking into account as a compensation speed the speed which is achieved from the addition of the speed differences of front and rear axles and retroactive division by a factor k, for example 2 or 3, ensures that the individual wheel reference speed is respectively adapted to the situation, and discrepancies due to road irregularities are largely compensated by summing of the front-axle and rear-axle difference. The factor k can be conformed to the desired sensitivity of response. Factor k can be chosen to be related to the vehicle, or can be made a function of other parameters.

For example, factor k can correlate with the vehicle lateral acceleration a which represents a standard of the curve radius of the, curve which is presently passed through. In this arrangement, the lateral acceleration a is greater the smaller the curve radius is at identical speeds. As a result, the greater the lateral acceleration a is, the greater the compensation speed should be chosen.

There is the possibility of taking into account only the speed difference of the front axle to identify cornering, as has already been described. A very simple structure of the pertinent calculating program is thereby achieved. When the speed difference of the rear wheels 6 and 8 is additionally taken into consideration, it can be excluded that cornering is falsely identified, which is of benefit to the control quality.

It is possible to limit the method of the present invention to ranges of low speeds. At low speeds, the effect of geometry during cornering is increased because smaller curve radii and, thus, greater speed differences between left and right vehicle sides are possible.

Basically, enhanced pedal comfort is achieved at the brake pedal with the method of the present invention because due to the smaller number of pressure reduction operations a reduced number of pressure increase operations is required on the curve-inward rear wheel 6. The result is a reduced flow rate and, thus, a smooth brake pedal application. The smaller number of pressure reduction operations minimizes noises which are caused by valve actuations. Generally, the outlet valve is actuated less frequently.

During cornering, the brake force on the rear axle can be utilized to a considerably better degree, without the driving stability being diminished. This requires lower pedal application forces, while the vehicle deceleration is identical to that in the state of the art.

Most of these advantages relate to a pressure-fluid operated brake system. An enhanced utilization of brake force is, however, of benefit to any type of brake systems equipped with electronic brake force distribution, provided the method of the present invention is employed.

What is claimed is:

1. Method of electronic brake force distribution on a two-axle, four-wheel vehicle during cornering, wherein a respective individual wheel reference speed derived from at least one wheel sensor signal is compared with a vehicle reference speed to determine the activation of electronic brake force distribution on a rear wheel, the method comprising the steps of:

determining individual wheel speed differences between left and right from a comparison between the individual wheel speeds of right and left front wheel and right and left rear wheels produced from respective wheel sensor signals;

taking into account said individual wheel speed differences for the calculation of a compensation speed;

adding the compensation speed to the individual wheel speed associated with a curve-inward rear wheel and produced from the wheel sensor signal of said curve-inward rear wheel; and setting the sum of said adding as the individual wheel reference speed of said curve-inward rear wheel, wherein, for the calculation of the compensation speed, a difference of the individual wheel speeds of the rear axle is also ascertained, and a compensation speed is calculated only when the signs of the speed differences of front and rear axles are equal, and wherein the compensation speed is calculated by summing said differences between front wheel speeds and between rear wheel speeds and dividing this sum by a factor k, wherein k is in the range of $1.5<k<4$.

2. Method as claimed in claim 1, including the step of setting the individual wheel speeds of the front wheels and a faster rear wheel as individual wheel reference speeds of these wheels.

3. Method as claimed in claim 1, including the step of setting the vehicle reference speed during braking to be equal to a maximum individual wheel speed.

4. Method of electronic brake force distribution on a two-axle, four-wheel vehicle during cornering, wherein a respective individual wheel reference speed derived from at least one wheel sensor signal is compared with a vehicle reference speed to determine the activation of electronic brake force distribution on a rear wheel, the method comprising the steps of:

wheels determining a difference between the individual wheel speeds of right and left front wheels and right and left rear wheels produced from respective wheel sensor signals;

determining a compensation speed based on said determining step only when the signs of said difference between the individual wheel speeds of right and left front wheels and right and left rear wheels are equal;

adding the compensation speed to the individual wheel speed associated with a curve-inward rear wheel to determine an individual wheel reference speed for the curve-inward rear wheel.

5. Method as claimed in claim 4, wherein the compensation speed is determined by summing said differences between front wheel speeds and between rear wheel speeds and dividing this sum by a factor k, wherein k is in the range of $1.5 \leq k \leq 4$.

6. Method as claimed in claim 4, wherein the vehicle reference speed comprises a maximum wheel speed of the individual wheel speeds of right and left front wheels and right and left rear wheels.

7. Method as claimed in claim 4, wherein said compensation speed is inversely proportional to a curve radius of the vehicle.

8. Method as claimed in claim 4, wherein said compensation speed is proportional to a lateral acceleration of the vehicle.

* * * * *

UNITED STATES PATENT AND TRADEMARK OFFICE
CERTIFICATE OF CORRECTION

PATENT NO.   : 6,510,372 B1  
DATED        : January 21, 2003  
INVENTOR(S)  : Markus Zenzen and Thomas Pröger It is certified that error appears in the above-identified patent and that said Letters Patent is hereby corrected as shown below:

<u>Column 4,</u>
Line 40, please delete -- wheels --.

Signed and Sealed this

Seventeenth Day of June, 2003

JAMES E. ROGAN
*Director of the United States Patent and Trademark Office*